United States Patent [19]
Ogawa et al.

[11] Patent Number: 5,915,127
[45] Date of Patent: Jun. 22, 1999

[54] SYSTEM FOR FAST DATA TRANSFER UTILIZING SEPARATION OF TRANSFER DATA HEADER AND SUBSTANTIALLY CONTINUOUSLY READING AND PROCESSING TRANSFER DATA BASED ON READ HEADER

[75] Inventors: Hitoshi Ogawa; Hideo Makabe, both of Kasugai, Japan

[73] Assignee: Fujitsu Limited, Kanagawa, Japan

[21] Appl. No.: 08/769,532

[22] Filed: Dec. 19, 1996

[30] Foreign Application Priority Data

Feb. 29, 1996 [JP] Japan ................................. 8-043646

[51] Int. Cl.$^6$ .......................... G06F 13/38; G06F 13/42
[52] U.S. Cl. ...................... 395/878; 395/280; 395/293; 395/307; 370/60
[58] Field of Search .................................. 395/307, 293, 395/280, 821, 878, 872; 370/60

[56] References Cited

U.S. PATENT DOCUMENTS

| | | | |
|---|---|---|---|
| 4,617,564 | 10/1986 | Yoshioka | 340/798 |
| 5,128,931 | 7/1992 | Yamanaka et al. | 370/60 |
| 5,263,024 | 11/1993 | Kumaki et al. | 370/94.1 |
| 5,291,486 | 3/1994 | Koyanagi | 370/84 |
| 5,497,404 | 3/1996 | Grover et al. | 375/357 |
| 5,524,054 | 6/1996 | Spille | 381/18 |
| 5,526,495 | 6/1996 | Shibata et al. | 395/307 |
| 5,758,089 | 5/1998 | Gentry et al. | 395/200.64 |

FOREIGN PATENT DOCUMENTS 41 22 831 A1 1/1992 Germany.
WO 94/07196 3/1994 WIPO.

OTHER PUBLICATIONS

"Fire, Fibre, SSA", Schnurer, in c't, No. 6, 1995, pp. 126–134.

Primary Examiner—Thomas C. Lee
Assistant Examiner—Rehana Perveen
Attorney, Agent, or Firm—Nikaido Marmelstein Murray & Oram, LLP

[57] ABSTRACT

A data processing apparatus suitable for fast processing of a large amount of data provides continuous and real-time reproduction of moving pictures that have a reality to them. In one embodiment, the data processing apparatus includes: a first memory for receiving and storing first transfer data supplied from an external device in a first transfer mode for transferring data in a predetermined cycle; a second memory for receiving and storing second transfer data supplied from the external device in a second transfer mode, the second transfer mode transfers the second transfer data using a remaining time resulting from exclusion of a time needed for transfer of the first transfer data from the predetermined cycle; a first interface for receiving the first transfer data read from the first memory and outputting the first transfer data; and a second interface for receiving the second transfer data read from the second memory and outputting the second transfer data.

12 Claims, 11 Drawing Sheets

SYSTEM FOR FAST DATA TRANSFER UTILIZING SEPARATION OF TRANSFER DATA HEADER AND SUBSTANTIALLY CONTINUOUSLY READING AND PROCESSING TRANSFER DATA BASED ON READ HEADER

BACKGROUND OF THE INVENTION

1. Field of the Invention

The present invention relates generally to a data processing apparatus that conforms to the IEEE (Institute for Electrical and Electronics Engineers) 1394 serial interface standards. More particularly, the invention relates to a data processing apparatus suitable for rapid processing of a vast amount of reception and transmission data.

2. Description of the Related Art

In today's multimedia environment, interfaces need to be able to transfer an increased amount of data between a personal computer and peripheral devices and need to have a fast transfer speed. Peripheral devices in the multimedia environment include, for example, a digital video camera and a digital VCR (Video Cassette Recorder), or a color page printer. These peripheral devices tend to handle a vast amount of audio data and/or moving picture data. The IEEE 1394 standard is applied to, for example, a serial interface which couples peripheral devices to a personal computer. The IEEE 1394 protocol permits a vast amount of sequential moving picture data to be transferred in real time. The IEEE 1394 protocol includes an isochronous transfer mode and an asynchronous transfer mode. In the isochronous transfer mode, data is transferred packet (Isoc packet) by packet every predetermined period (125 $\mu$s). In the asynchronous transfer mode, a free time in each predetermined period excluding the time in which an Isoc packet should be transferred is used for data transfer. Transferring moving picture data to a computer every given time in the isochronous transfer mode allows the computer to continuously reproduce moving pictures. Accordingly, the IEEE 1394 protocol facilitates reproduction of quality moving pictures.

As shown in FIG. 1, a conventional IEEE 1394 protocol controller (IPC) 80 that is incorporated in a personal computer 100 is connected to a peripheral device 90 by an IEEE 1394 bus cable 92 and is connected to a microprocessor unit (MPU) by an MPU bus cable 94. The IPC 80 includes a protocol control circuit 81, a data storage memory 82 comprised of an FIFO register, an IEEE 1394 interface 83 and an MPU interface 84.

In the isochronous transfer mode, the IEEE 1394 interface 83 receives isochronous (Isoc) packets 86 and 88 from the peripheral device 90 every period of 125 $\mu$s or every Isoc cycle as shown in FIG. 2 and supplies those Isoc packets to the protocol control circuit 81. Each Isoc packet 86 or 88 includes transfer data 86b or 88b and a header 86a or 88a affixed to the head of the associated transfer data 86b or 88b. For example, moving picture data, which cannot be transferred in one Isoc cycle due to its large amount, is separated into a plurality of packets, which are transferred over several cycles. At the time of transfer, the headers 86a and 88a are affixed to the respective Isoc packets 86 and 88. The protocol control circuit 81 receives the Isoc packet 86 or 88 and checks if the Isoc packet is to be stored in a memory based on the header 86a or 88a of the received Isoc packet. Data to be transferred on the IEEE 1394 bus cable 92 is serial data. Serial data in an Isoc packet to be stored in the memory is converted by the protocol control circuit 81 to parallel data which is in turn stored in the storage memory 82. The MPU interface 84 reads an Isoc packet from the storage memory 82 and transfers that Isoc packet to the MPU 85 via the MPU bus 94. The MPU 85 performs data processing in accordance with information included in the header of the Isoc packet.

In the asynchronous transfer mode, as shown in FIG. 2, the IEEE 1394 interface 83 receives an asynchronous (Asyn) packet 87 from the peripheral device 90 in a free time in one Isoc cycle excluding the transfer time for the Isoc packet 86. The Asyn packet 87 includes transfer data 87b and a header 87a affixed to the head of the transfer data 87b. The protocol control circuit 81 receives the Asyn packet 87 from the IEEE 1394 interface 83 and checks if this Asyn packet 87 is to be stored in the memory based on the header 87a of the Asyn packet 87. Serial data in the Asyn packet to be stored in the memory is converted to parallel data which is in turn stored in the storage memory 82. The MPU interface 84 reads an Asyn packet from the storage memory 82 and transfers that Asyn packet to the MPU 85 via the MPU bus 94. The MPU 85 performs data processing in accordance with information included in the header of the Asyn packet.

The IPC 80 receives the Isoc packet 86 and the Asyn packet 87 transferred in the first Isoc cycle and the Isoc packet 88 transferred in the next Isoc cycle, and supplies the Isoc packet 86, the Asyn packet 87, data 89 for the controller's control processing and the Isoc packet 88 to the MPU 85 in order. The data 89 for the controller's control processing, which is produced by the IPC 80 or the MPU 85, includes command data for data processing by the MPU 85 and IPC 80. This IPC 80, however, suffers a shortcoming such that the supply of the Isoc packet 88 in the next Isoc cycle is delayed by the supply of the Asyn packet 87 and the data 89 for the controller's control processing which have been transferred in the previous Isoc cycle. In other words, the IPC 80 cannot transfer the next Isoc packet during transfer of an Asyn packet or during the controller's control operation. This problem makes it difficult to accomplish the continuous and real-time reproduction of moving pictures with reality.

The conventional IPC 80 supplies the individual packets 86, 87 and 88, with the headers 86a, 87a and 88a affixed to the respective transfer data 86b, 87b and 88b, to the MPU 85. The MPU 85 analyzes the individual headers 86a, 87a and 88a and handles the moving picture data 86b and 88b, separated into the respective packets 86 and 88, as continuous data. The MPU 85 sequentially removes the headers 86a, 87a and 88a from the Isoc packet 86, the Asyn packet 87 and the Isoc packet 88 after analysis to form continuous data. This formation of continuous data increases a load on the MPU 85 and reduces the data processing speed of the MPU 85. As a result, with the conventional IPC 80, it is difficult to accomplish the continuous and real-time reproduction of moving pictures with reality. Further, the MPU 85 affixes a header to each transfer data to form a packet at the time of data transmission. This header formation processing during data transmission also increases the load on the MPU 85.

SUMMARY OF THE INVENTION

Broadly speaking, the present invention relates to a data processing apparatus suitable for fast processing of a large amount of data to achieve continuous and real-time reproduction of moving pictures that have a reality to them.

The present invention can be implemented in numerous ways, including as an apparatus and method. Several embodiments of the invention are discussed below.

As a data processing apparatus for transferring transfer data supplied from an external device, an embodiment of the invention includes: a first memory for receiving and storing first transfer data supplied from the external device in a first transfer mode for transferring data in a predetermined cycle; a second memory for receiving and storing second transfer data supplied from the external device in a second transfer mode, the second transfer mode transfers the second transfer data using a remaining time resulting from exclusion of a time needed for transfer of the first transfer data from the predetermined cycle; a first interface for receiving the first transfer data read from the first memory and outputting the first transfer data; and a second interface for receiving the second transfer data read from the second memory and outputting the second transfer data.

As a data processing apparatus for exchanging packets with an external device, each packet including transfer data and a header affixed to the transfer data, and for exchanging transfer data and headers with an internal device, an embodiment of the invention includes: a packet analyzer for receiving a first packet supplied from the external device and separating first transfer data and a first header in the first packet from each other in a first transfer mode for transferring a packet in a predetermined cycle, and receiving a second packet supplied from the external device and separating second transfer data and a second header in the second packet from each other in a second transfer mode, the second transfer mode transfers the second packet using a remaining time resulting from exclusion of a time needed for transfer of the first packet from the predetermined cycle; a header memory, for receiving and storing one of the first and second headers supplied from the packet analyzer; a transfer data memory for receiving and storing one of the first and second transfer data supplied from the packet analyzer; and an interface for receiving one of the first and second headers read from the header memory and one of the associated first and second transfer data read from the transfer data memory, and supplying the one of the first and second headers and the one of the first and second transfer data separately to the internal device.

As a method of processing and transferring transfer data supplied from an external device, an embodiment of the invention includes the operations of: storing first reception transfer data supplied from the external device in a first memory in a first transfer mode for transferring data in accordance with a predetermined cycle; storing second reception transfer data supplied from the external device in a second memory in a second transfer mode, the second transfer mode transfers the second reception transfer data using a remaining time resulting from exclusion of a time needed for transfer of the first reception transfer data from the predetermined cycle; transferring the first reception transfer data read from the first memory using a first interface; and transferring the second reception transfer data read from the second memory using a second interface.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following detailed description of various embodiments together with the accompanying drawings, in which.

DETAILED DESCRIPTION OF THE PREFERRED EMBODIMENTS

First Embodiment

Figure 1:
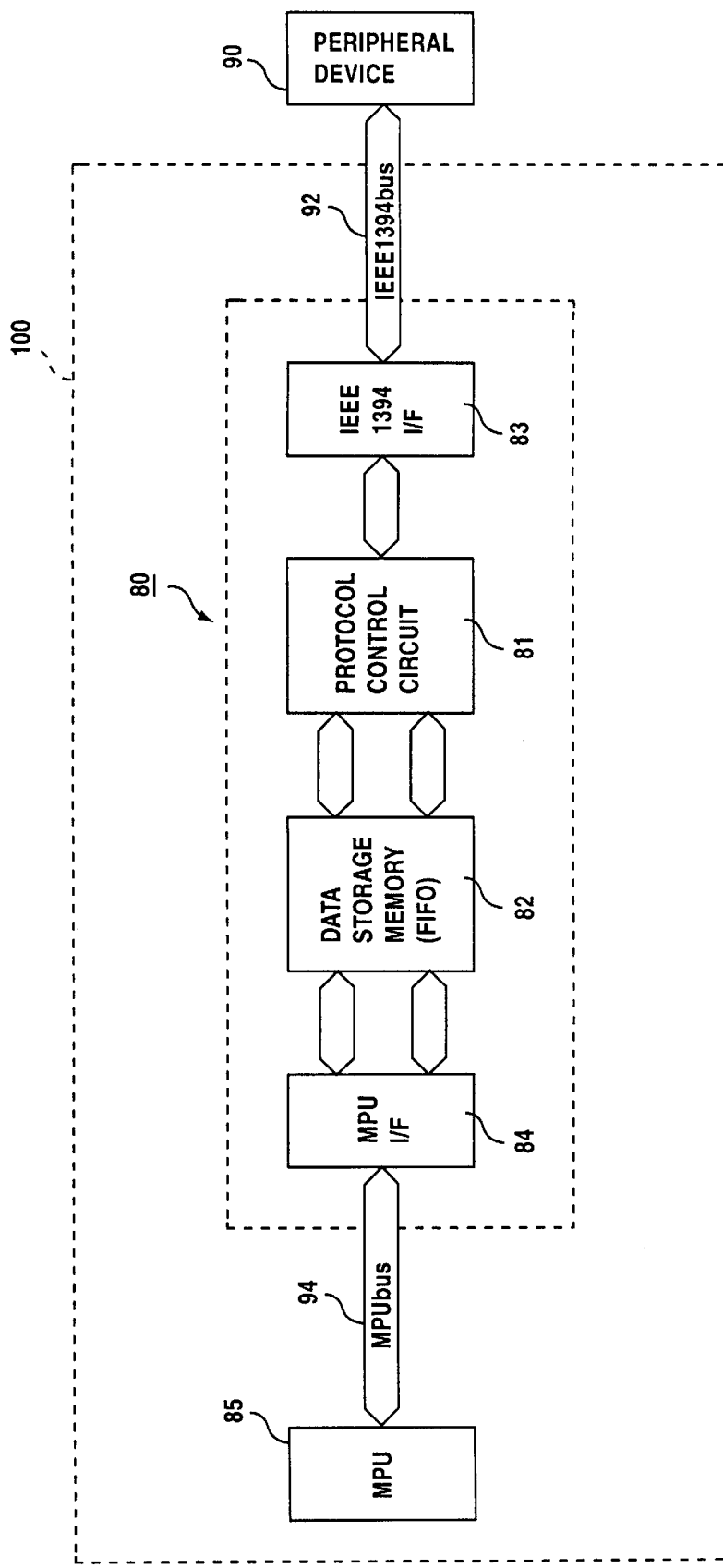
FIG. 1 is a block circuit diagram illustrating a conventional IEEE 1394 protocol controller.
Figure 2:
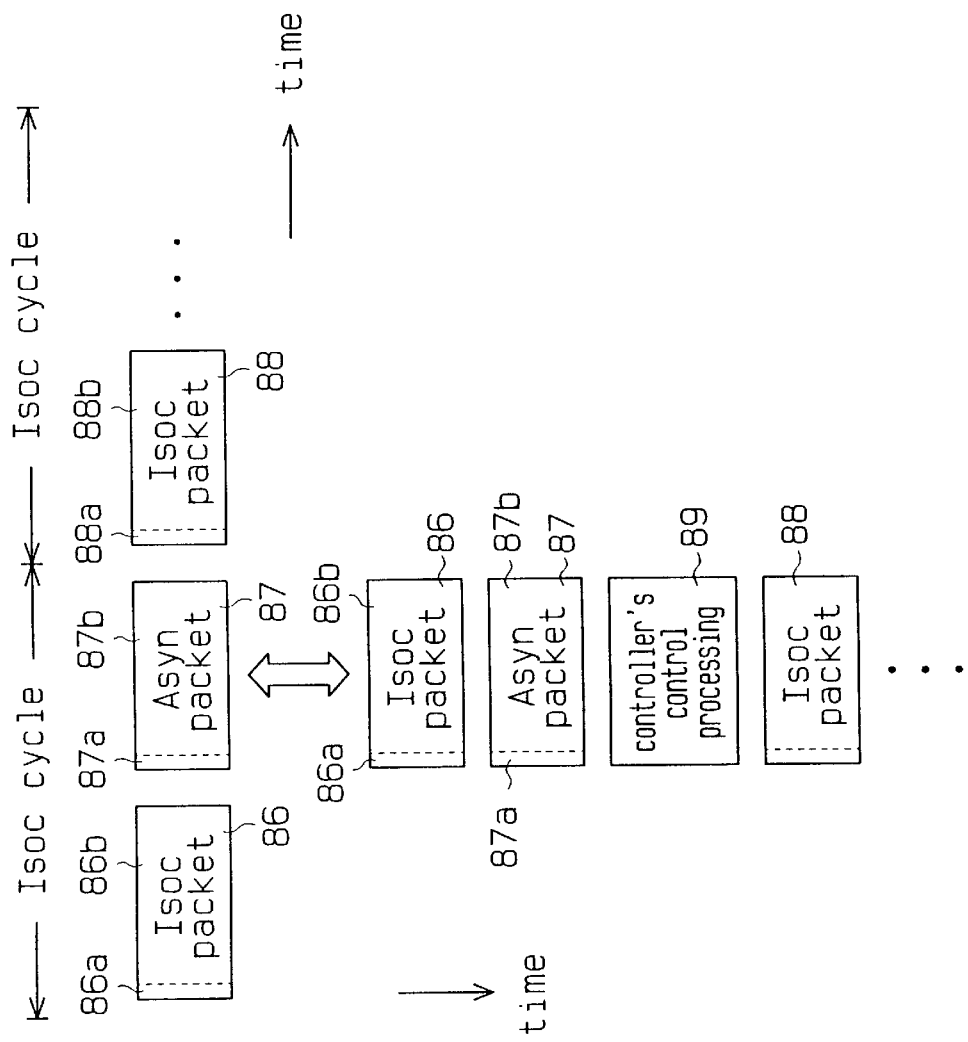
FIG. 2 is a diagram showing packets to be transferred by the conventional IEEE 1394 protocol controller.
Figure 3:
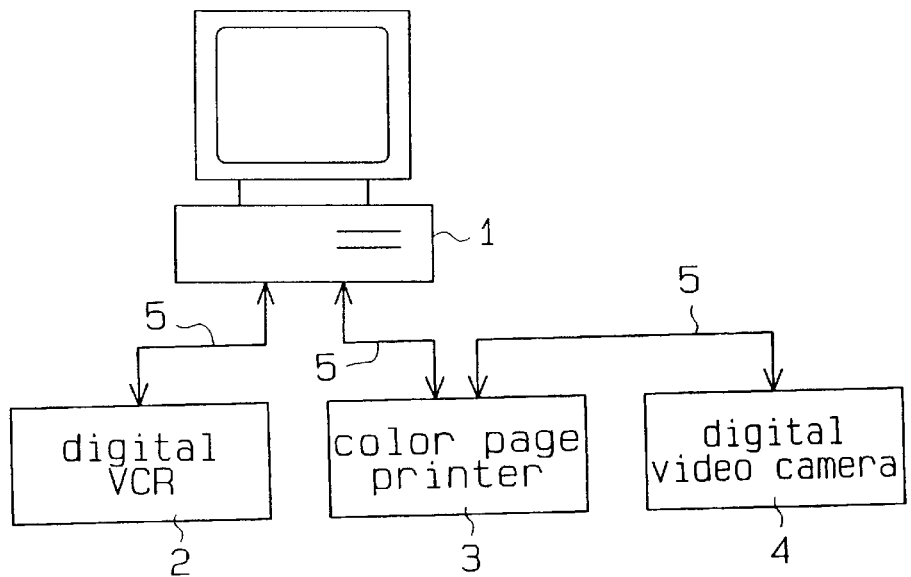
FIG. 3 is a structural diagram of a system using an IEEE 1394 bus.

The first embodiment of the present invention will now be described referring to the accompanying drawings. As shown in FIG. 3, a system which conforms to the IEEE 1394 serial interface standard comprises a personal computer 1, a digital VCR 2, a color page printer 3 and a digital video camera 4. The digital VCR 2, the color page printer 3 and the digital video camera 4 are peripheral devices and are connected to the personal computer 1 by IEEE 1394 bus cables (hereinafter called "IEEE 1394 buses") 5. The color page printer 3 is connected to the digital video camera 4 via an IEEE 1394 bus 5. The digital video camera 4 is therefore connected to the personal computer 1 via two IEEE 1394 buses 5. Each of the personal computer 1, the digital VCR 2, the color page printer 3 and the digital video camera 4 is equipped with an IEEE 1394 protocol controller.

Figure 4:
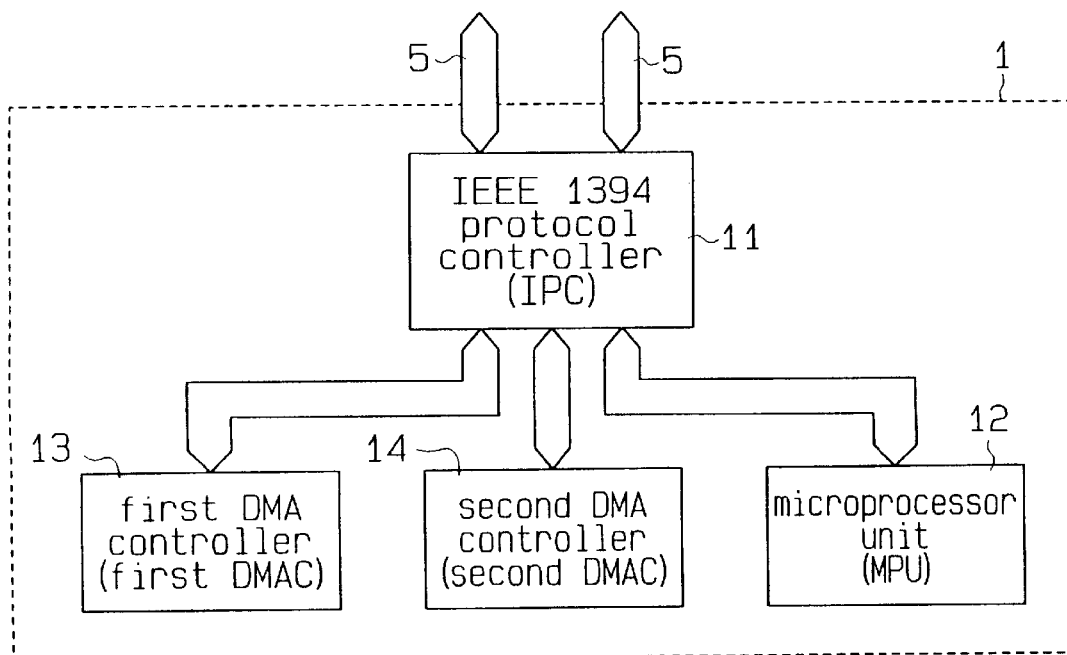
FIG. 4 is a block circuit diagram depicting the internal structure of a personal computer in the system in FIG. 3.

As shown in FIG. 4, the personal computer 1 has an IEEE 1394 protocol controller (IPC) 11, a microprocessor unit (MPU) 12 and first and second direct memory access controllers (DMACs) 13 and 14. The IPC 11, the MPU 12, and first and second DMACs 13 and 14 are formed by semiconductor integrated circuit (LSI) chips. The MPU 12 and the first and second DMACs 13 and 14 constitute an internal device. The IPC 11 exchanges data with the MPU 12, the first DMAC 13 and the second DMAC 14. The IPC 11 is connected to the IEEE 1394 protocol controllers (not shown) incorporated in the digital VCR 2, the color page printer 3 and the digital video camera 4 by the IEEE 1394 bus 5.

Figure 5:
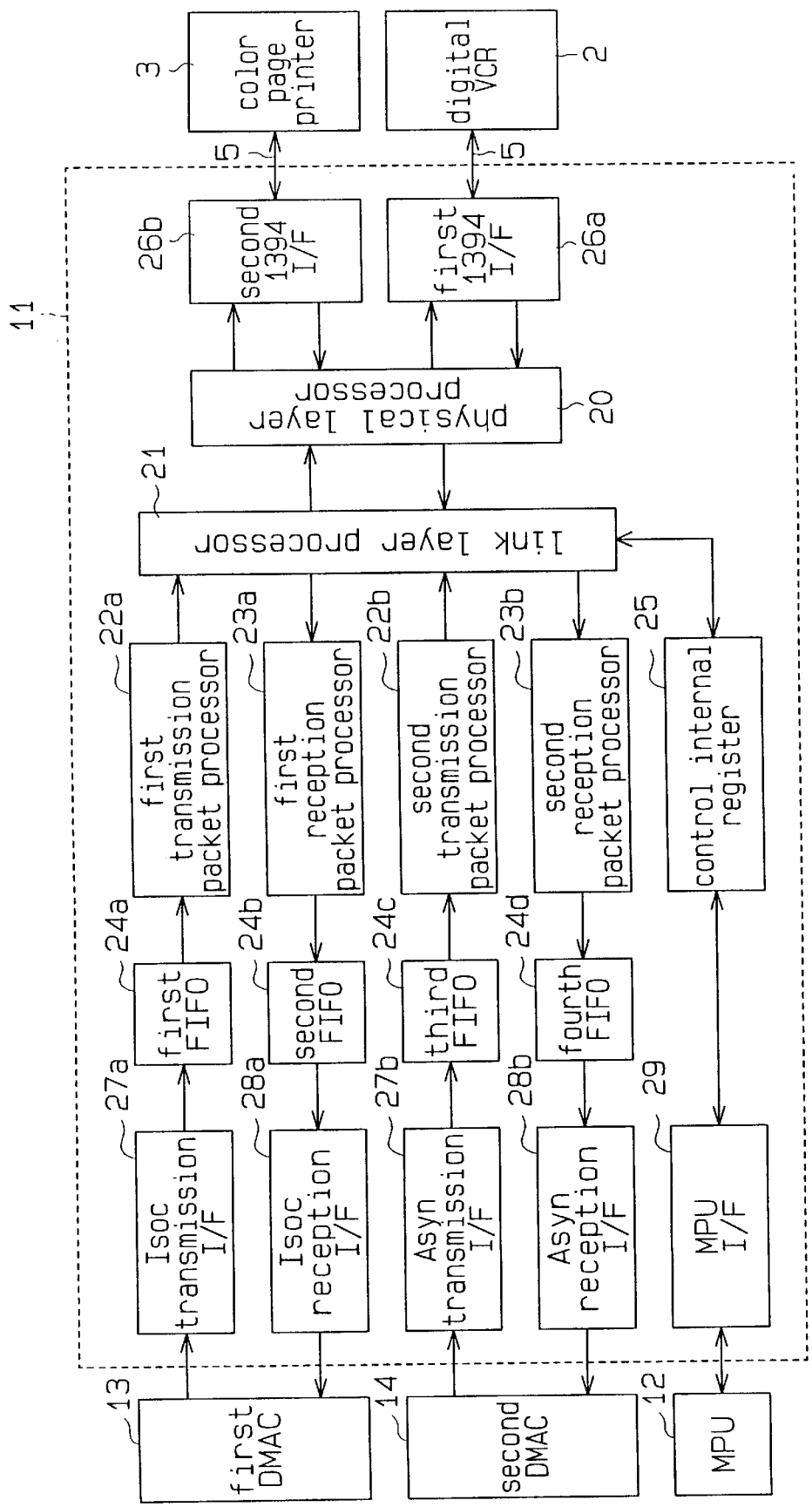
FIG. 5 is a block circuit diagram illustrating an IEEE 1394 protocol controller according to a first embodiment of the invention.

As shown in FIG. 5, the IPC 11 includes a physical layer processor 20, a link layer processor 21, first and second transmission packet processors 22a and 22b, first and second reception packet processors 23a and 23b, first to fourth storage memories (first to fourth FIFOs) 24a to 24d each comprised of an FIFO (First In First Out) register, a control internal register 25, first and second 1394 interfaces (I/F) 26a and 26b, an isochronous data transmission interface (Isoc transmission I/F) 27a, an isochronous data reception interface (Isoc reception I/F) 28a, an asynchronous data transmission interface (Asyn transmission I/F) 27b, an asynchronous data reception interface (Asyn reception I/F) 28b and an MPU interface (I/F) 29.

The first 1394 I/F 26a is connected to the digital VCR 2 by the IEEE 1394 bus 5. The first 1394 I/F 26a exchanges Isoc packets 31 (see FIG. 6) with the IPCs of the physical layer processor 20 and the digital VCR 2 in an isochronous (Isoc) transfer mode and exchanges Asyn packets 32 with those IPCs in an asynchronous (Asyn) transfer mode. The second 1394 I/F 26b is connected to the color page printer 3 by the IEEE 1394 bus 5. The second 1394 I/F 26b exchanges Isoc packets 31 with the IPCs of the physical layer processor 20 and the color page printer 3 in the Isoc transfer mode and exchanges Asyn packets 32 with those IPCs in the Asyn transfer mode.

Figure 6:
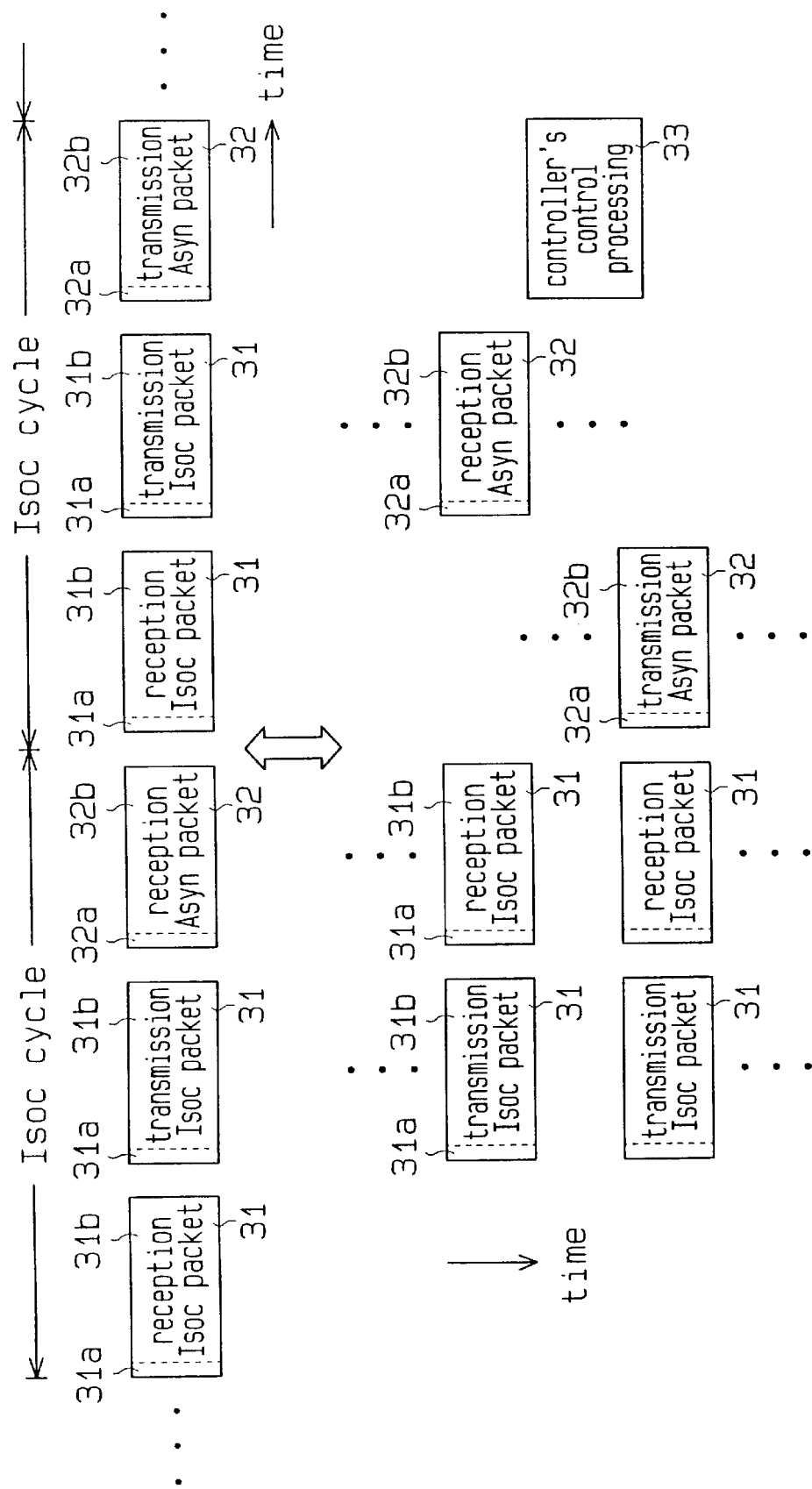
FIG. 6 is a diagram showing packets to be transferred by the IEEE 1394 protocol controller according to the first embodiment of the invention.

As shown in FIG. 6, each Isoc packet 31 includes isochronous (Isoc) data 31b and a header 31a affixed to the head of the Isoc data 31b. Each Asyn packet 32 includes asynchronous (Asyn) data 32b and a header 32a affixed to the head of the Asyn data 32b.

Referring again to FIG. 5, the Isoc transmission I/F 27a, connected to the first DMAC 13, receives an Isoc packet from the first DMAC 13, which is to be supplied in the Isoc transfer mode, and supplies this Isoc packet to the first FIFO 24a. The Isoc reception I/F 28a, connected to the first DMAC 13, receives an Isoc packet from the second FIFO 24b and supplies this Isoc packet to the first DMAC 13. The Asyn transmission I/F 27b, connected to the second DMAC 14, receives an Asyn packet from the second DMAC 14, which is to be supplied in the Asyn transfer mode, and supplies this Asyn packet to the third FIFO 24c. The Asyn reception I/F 28b, connected to the second DMAC 14, receives an Asyn packet from the fourth FIFO 24d and supplies this Asyn packet to the second DMAC 14. The MPU I/F 29, connected to the MPU 12, exchanges various kinds of command data with the MPU 12 and the control internal register 25.

The physical layer processor 20 receives Isoc packets and Asyn packets from the first and second 1394 I/Fs 26a and 26b and supplies those packets to the link layer processor 21. The physical layer processor 20 also receives an Isoc packet and Asyn packet from the link layer processor 21 and supplies those packets to the associated one of the first and second 1394 I/Fs 26a and 26b. The first 1394 I/F 26a supplies the received Isoc and Asyn packets to the digital VCR 2. The second 1394 I/F 26b supplies the received Isoc and Asyn packets to the color page printer 3 and the digital video camera 4 via the color page printer 3.

The link layer processor 21 receives Isoc and Asyn packets supplied from the physical layer processor 20 and determines if the destination of the packet is the personal computer 1, based on the headers included in the packets. When the received packet is to be supplied to the personal computer 1, the link layer processor 21 supplies the packet to the associated one of the first and second reception packet processors 23a and 23b. When the destination of the received packet is not the personal computer 1, the link layer processor 21 supplies the packet to the first and second 1394 I/Fs 26a and 26b via the physical layer processor 20 so that the received packet is returned to the digital VCR 2, the color page printer 3 or the digital video camera 4. The link layer processor 21 also determines if the received packet is an Isoc packet or an Asyn packet based on the header included in that packet. When the received packet is an Isoc packet 31, the link layer processor 21 supplies the Isoc packet 31 to the first reception packet processor 23a. When the received packet is an Asyn packet 32, the link layer processor 21 supplies the Asyn packet 32 to the second reception packet processor 23b. The link layer processor 21 receives an Isoc packet transferred from the first transmission packet processor 22a and an Asyn packet transferred from the second transmission packet processor 22b.

The first reception packet processor 23a receives an Isoc packet supplied from the link layer processor 21 and performs separate error correcting processes for the header and Isoc data included in that Isoc packet. The second FIFO 24b operates to store an error-corrected Isoc packet supplied from the first reception packet processor 23a and supply the Isoc packet to the Isoc reception I/F 28a in the order stored (storing order).

The second reception packet processor 23b receives an Asyn packet supplied from the link layer processor 21 and performs separate error correcting processes for the header and Asyn data included in that Asyn packet. The fourth FIFO 24d operates to store an error-corrected Asyn packet supplied from the second reception packet processor 23b and supply the Asyn packet to the Asyn reception I/F 28b in the storing order.

The first FIFO 24a operates to store an Isoc packet supplied via the Isoc transmission I/F 27a from the first DMAC 13, which is to be transmitted in the Isoc transfer mode, and supply the Isoc packet to the first transmission packet processor 22a in the storing order. The first transmission packet processor 22a receives an Isoc packet from the first FIFO 24a and produces separate error correction codes for the header and Isoc data included in that Isoc packet. The first transmission packet processor 22a assembles those error correction codes into an Isoc packet and supplies the Isoc packet to the link layer processor 21.

The third FIFO 24c operates to store an Asyn packet supplied via the Asyn transmission I/F 27b from the second DMAC 14, which is to be transmitted in the Asyn transfer mode, and supply the Asyn packet to the second transmission packet processor 22b in the storing order. The second transmission packet processor 22b receives an Asyn packet from the third FIFO 24c and produces separate error correction codes for the header and Asyn data included in that Asyn packet. The second transmission packet processor 22b assembles those error correction codes into an Asyn packet and supplies the Asyn packet to the link layer processor 21.

The control internal register 25, provided between the MPU I/F 29 and the link layer processor 21 temporarily stores control data including various commands which are exchanged between the MPU 12 and the IPC 11. The control data supplied from the MPU 12 is read from the control internal register 25 by the link layer processor 21, and the IPC 11 performs a control operation for a transfer process in accordance with the control data. The control data supplied from the link layer processor 21 is read by the MPU 12, and the MPU 12 performs a control operation for a transfer process in accordance with the control data.

The operation of the IPC 11 of the first embodiment will now be discussed below. For ease of illustration, it is assumed that transmission and reception Isoc and Asyn packets 31 and 32 are to be transferred in the order illustrated in FIG. 6. In the first Isoc cycle, the reception Isoc packet 31 supplied from the digital VCR 2 is supplied to the link layer processor 21 via the first 1394 I/F 26a and the physical layer processor 20. The link layer processor 21 determines from the header 31a included in the reception Isoc packet 31 that the received packet is the Isoc packet which is to be transmitted in the Isoc transfer mode, and supplies the reception Isoc packet 31 to the first reception packet processor 23a. The first reception packet processor 23a executes error correction on the Isoc packet 31, and supplies the error-corrected Isoc packet 31 to the second FIFO 24b. The Isoc reception I/F 28a receives the Isoc packet 31 from the second FIFO 24b and supplies it to the first DMAC 13.

In the first Isoc cycle, the transmission Isoc packet 31, which is supplied from the first DMAC 13 following the reception Isoc packet 31, is supplied to the first transmission packet processor 22a via the Isoc transmission I/F 27a and the first FIFO 24a. The first transmission packet processor 22a produces error correction codes for the header 31a and the Isoc data 31b of the transmission Isoc packet 31, affixes those error correction codes to them, and then supplies the resultant transmission Isoc packet 31 to the link layer processor 21. The first transmission packet processor 22a further appends data indicative of the Isoc transfer mode transmission to the header 31a. The resultant transmission Isoc packet 31 is, for example, supplied to the color page printer 3 via the physical layer processor 20 and the second 1394 I/F 26b.

In the first Isoc cycle, the reception Asyn packet 32, which is supplied from the digital VCR 2 following the transmission Isoc packet 31, is supplied to the link layer processor 21 via the first 1394 I/F 26a and the physical layer processor 20. The link layer processor 21 determines from the header 32a included in the reception Asyn packet 32 that the received packet is the Asyn packet which is to be transmitted in the Asyn transfer mode, and supplies the reception Asyn packet 32 to the second reception packet processor 23b. The second reception packet processor 23b executes error correction on the Asyn packet 32, and supplies the error-corrected Asyn packet 32 to the fourth FIFO 24d. The Asyn reception I/F 28b receives the Asyn packet 32 from the fourth FIFO 24d and supplies it to the second DMAC 14.

In the second Isoc cycle following the first Isoc cycle, the first reception Isoc packet 31 supplied is processed in the same way as done in the first Isoc cycle. The link layer processor 21 determines that the reception Isoc packet 31 is the Isoc packet which is to be transmitted in the Isoc transfer mode, and the first reception packet processor 23a executes error correction on the reception Isoc packet 31. The Isoc reception I/F 28a receives the reception Isoc packet 31 supplied from the second FIFO 24b and supplies it to the first DMAC 13.

In the second Isoc cycle, the transmission Isoc packet 31 which is supplied from the first DMAC 13 following the reception Isoc packet 31 is processed in the same way as done in the first Isoc cycle. The first transmission packet processor 22a appends error correction codes to the transmission Isoc packet 31, and appends data indicative of the Isoc transfer mode transmission to the header 31a. The resultant transmission Isoc packet 31 is, for example, supplied to the color page printer 3 via the link layer processor 21, the physical layer processor 20 and the second 1394 I/F 26b.

In the second Isoc cycle, the transmission Asyn packet 32, which is supplied from the second DMAC 14 following the transmission Isoc packet 31, is supplied to the second transmission packet processor 22b via the Asyn transmission I/F 27b and the third FIFO 24c. The second transmission packet processor 22b appends error correction codes to the transmission Asyn packet 32, and appends data indicative of the Asyn transfer mode transmission to the header 32a. The resultant transmission Asyn packet 32 is, for example, supplied to the color page printer 3 via the link layer processor 21, the physical layer processor 20 and the second 1394 I/F 26b.

According to the first embodiment, as discussed above, the first and second FIFOs 24a and 24b for storing Isoc packets in the Isoc transfer mode and the third and fourth FIFOs 24c and 24d for storing Asyn packets in the Asyn transfer mode are separately provided. Further, the Isoc transmission and reception I/Fs 27a and 28a for interfacing Isoc packets in the Isoc transfer mode and the Asyn transmission and reception I/Fs 27b and 28b for interfacing Asyn packets in the Asyn transfer mode are separately provided. This structure allows the individual FIFOs to separately store Isoc and Asyn packets and allows the individual interfaces to separately interface Isoc and Asyn packets. It is therefore possible to simultaneously execute the transfer of the reception Asyn packet 32 in the Asyn transfer mode and the transfer of the reception Isoc packet 31 in the Isoc transfer mode. In other words, transferring the reception Isoc packet 31 is not interrupted in the Isoc transfer mode while the reception Asyn packet 32 is transferred in the Asyn transfer mode. These features permit the continuous and rapid transmission of reception Isoc packets 31 to be supplied to the first DMAC 13 from the Isoc reception I/F 28a. It is therefore possible to accomplish continuous and real-time transfer of moving picture data so as to produce moving pictures with a better reality than conventionally available.

Even when the transmission of a transmission Isoc packet 31 and the transmission of a reception Isoc packet 31 are combined, the reception Isoc packet 31 can be transferred to the first DMAC 13 in the first embodiment. The first reason is that the transmission Isoc packet 31 is stored in the first FIFO 24a while the reception Isoc packet 31 is stored in the second FIFO 24b. The second reason is that the Isoc transmission I/F 27a and the Isoc reception I/F 28a are provided respectively for transferring the transmission Isoc packet 31 from and the reception Isoc packet 31 to the first DMAC 13. This structure allows the transmission and reception Isoc packets 31 to be separately exchanged with the first DMAC 13 in the Isoc transfer mode.

Even when the transmission of a transmission Asyn packet 32 and the transmission of a reception Asyn packet 32 are combined, likewise, the reception Asyn packet 32 can be transferred to the second DMAC 14. The first reason is that the transmission Asyn packet 32 is stored in the third FIFO 24c while the reception Asyn packet 32 is stored in the fourth FIFO 24d. The second reason is that the Asyn transmission I/F 27b and the Asyn reception I/F 28b are provided respectively for transferring the transmission Asyn packet 32 from and the reception Asyn packet 32 to the second DMAC 14. This structure allows the transmission and reception Asyn packets 32 to be separately exchanged with the second DMAC 14 in the Asyn transfer mode.

According to the first embodiment, control data is exchanged between the MPU 12 and the link layer processor 21 via the MPU I/F 29. The operation of this MPU I/F 29 permits the IPC 11 to transfer the Isoc and Asyn packets 31 and 32 while exchange of control data is being performed.

Second Embodiment

Figure 7:
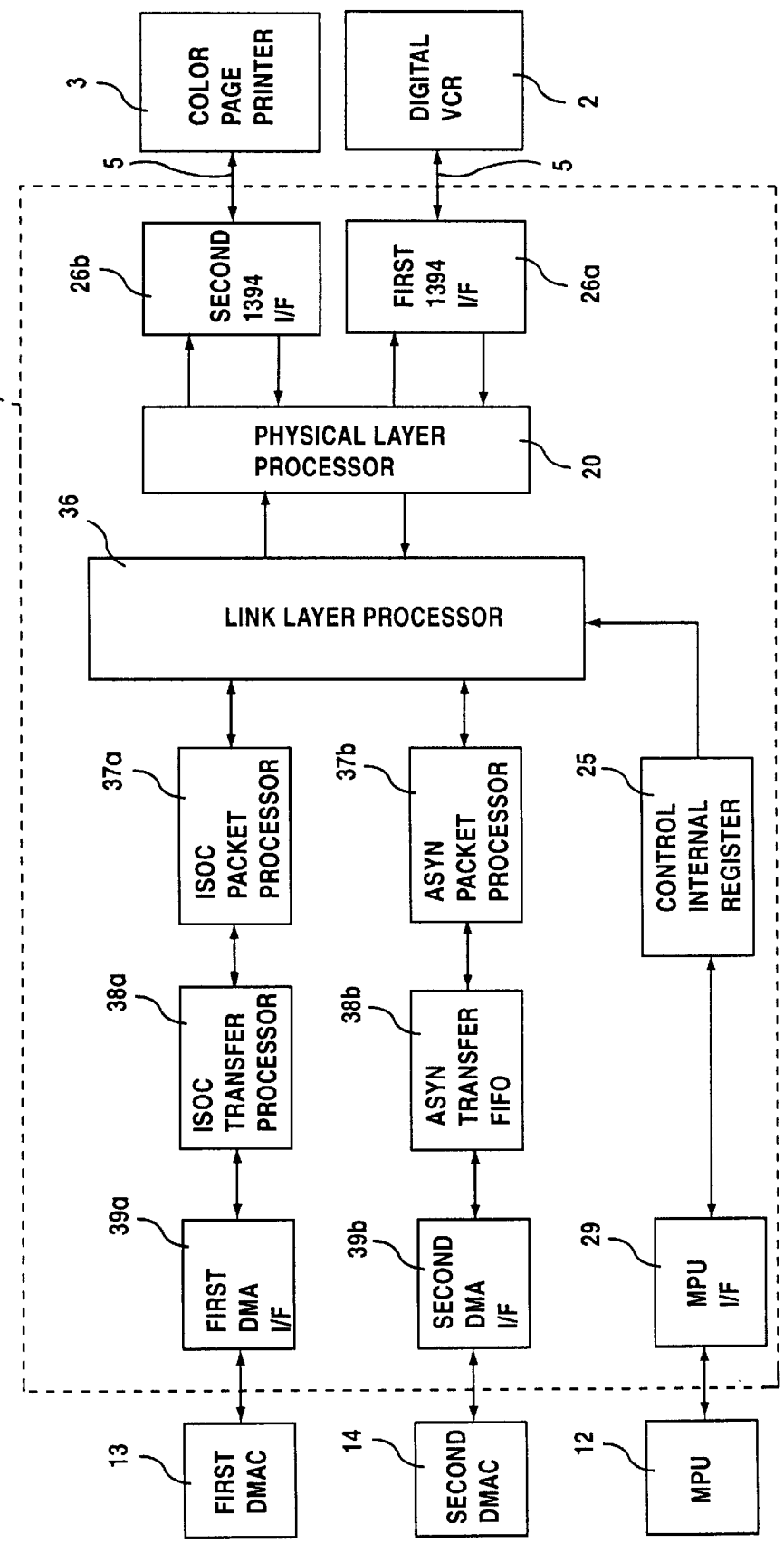
FIG. 7 is a block circuit diagram illustrating an IEEE 1394 protocol controller according to a second embodiment of the invention.

The second embodiment, which is a modification of the IPC 11 in the first embodiment, will now be explained with reference to the accompanying drawings. To avoid a redundant description, like or same reference numerals are given to those components which are the same as the corresponding components of the first embodiment. As shown in FIG. 7, the IPC 11 includes the physical layer processor 20, the first and second 1394 I/Fs 26*a* and 26*b*, a link layer processor 36, an Isoc packet processor 37*a*, an Asyn packet processor 37*b*, an Isoc transfer FIFO 38*a*, an Asyn transfer FIFO 38*b*, a first DMA interface (I/F) 39*a*, a second DMA interface (I/F) 39*b*, the control internal register 25 and the MPU I/F 29.

In the second embodiment, the single first DMA I/F 39*a* is connected to the first DMAC 13. The first DMA I/F 39*a* exchanges transmission and reception Isoc packets with the first DMAC 13. The exchanging of the transmission and reception Isoc packets is executed by the single first DMA I/F 39*a*. The Isoc transfer FIFO 38*a* operates to temporarily store a transmission Isoc packet supplied from the first DMA I/F 39*a* and supply the transmission Isoc packet to the Isoc packet processor 37*a* in the storing order. The Isoc transfer FIFO 38*a* also operates to temporarily store a reception Isoc packet supplied from the Isoc packet processor 37*a* and supply the reception Isoc packet to the first DMA I/F 39*a* in the storing order. When the Isoc transfer FIFO 38*a* is retaining or supplying one of the reception and transmission Isoc packets, the other Isoc packet cannot be stored.

The Isoc packet processor 37*a* receives the transmission Isoc packet supplied from the Isoc transfer FIFO 38*a*, and produces separate error correction codes for the header and Isoc data of this transmission Isoc packet. The transmission Isoc packet with the error correction codes inserted therein is supplied to the link layer processor 36. The Isoc packet processor 37*a* also receives the reception Isoc packet supplied from the link layer processor 36 and performs separate error correction processes for the header and Isoc data of this reception Isoc packet. The error-corrected reception Isoc packet is supplied to the Isoc transfer FIFO 38*a*.

The single second DMA I/F 39*b* is connected to the second DMAC 14. The second DMA I/F 39*b* exchanges transmission and reception Asyn packets with the second DMAC 14. The exchanging of the transmission and reception Asyn packets is executed by the single second DMA I/F 39*b*. The Asyn transfer FIFO 38*b* temporarily stores a transmission Asyn packet supplied from the second DMA I/F 39*b* and supplies the transmission Asyn packet to the Asyn packet processor 37*b* in the storing order. The Asyn transfer FIFO 38*b* also temporarily stores a reception Asyn packet supplied from the Asyn packet processor 37*b* and supplies the reception Asyn packet to the second DMA I/F 39*b* in the storing order. When the Asyn transfer FIFO 38*b* is retaining or supplying one of the reception and transmission Asyn packets, the other Asyn packet cannot be stored.

The Asyn packet processor 37*b* receives the transmission Asyn packet supplied from the Asyn transfer FIFO 38*b*, and produces separate error correction codes for the header and Asyn data of this transmission Asyn packet. The transmission Asyn packet with the error correction codes inserted therein is supplied to the link layer processor 36. The Asyn packet processor 37*b* also receives the reception Asyn packet supplied from the link layer processor 36 and performs separate error correction processes for the header and Asyn data of this reception Asyn packet. The error-corrected reception Asyn packet is supplied to the Asyn transfer FIFO 38*b*.

Figure 8:
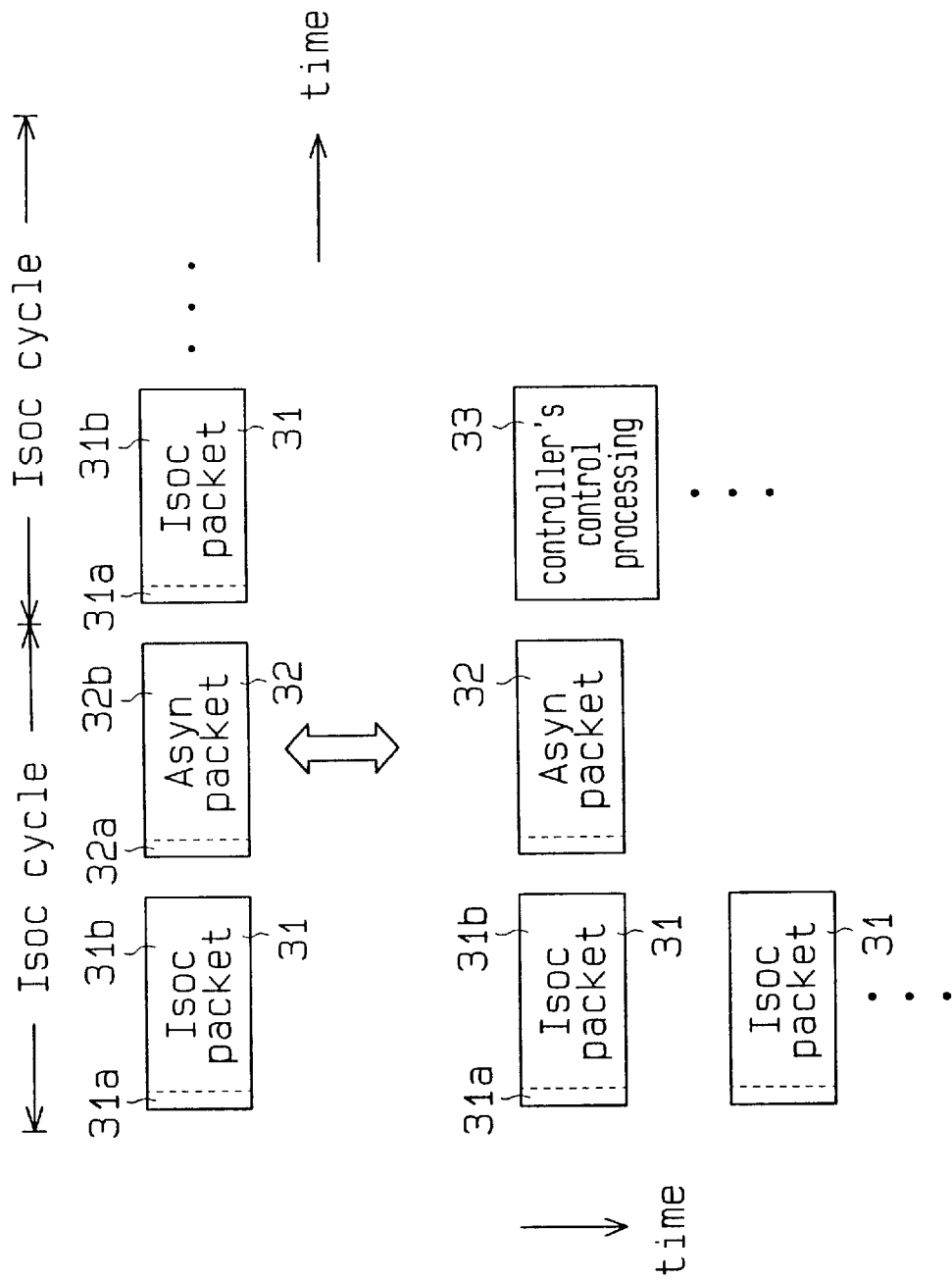
FIG. 8 is a diagram showing packets to be transferred by the IEEE 1394 protocol controller according to the second embodiment of the invention.

The operation of the IPC 11 of the second embodiment, will now be discussed below. For ease of illustration, it is assumed that transmission and reception Isoc and Asyn packets 31 and 32 are to be transferred in the order illustrated in FIG. 8. In the first Isoc cycle, the reception Isoc packet 31 supplied from the digital VCR 2 is supplied to the link layer processor 36 via the first 1394 I/F 26*a* and the physical layer processor 20. The link layer processor 36 supplies the reception Isoc packet 31 to the Isoc packet processor 37*a*, and the Isoc packet processor 37*a* supplies the error-corrected reception Isoc packet 31 to the Isoc transfer FIFO 38*a*. The reception Isoc packet 31 is supplied to the first DMAC 13 from the Isoc transfer FIFO 38*a* via the first DMA I/F 39*a*.

In the first Isoc cycle, the reception Asyn packet 32, which is supplied after the reception Isoc packet 31, is supplied to the link layer processor 36 via the first 1394 I/F 26*a* and the physical layer processor 20. The reception Asyn packet 32 is supplied to the second DMAC 14 via the link layer processor 36, the Asyn packet processor 37*b*, the Asyn transfer FIFO 38*b* and the second DMA I/F 39*b*.

In the second Isoc cycle following the first Isoc cycle, the first reception Isoc packet 31 supplied is processed in the same way as done in the first Isoc cycle. The reception Isoc packet 31 is supplied to the first DMAC 13 via the link layer processor 36, the Isoc packet processor 37*a*, the Isoc transfer FIFO 38*a* and the first DMA I/F 39*a*.

As apparent from the above, the constitution of the second embodiment allows the Isoc and Asyn transfer FIFOs 38*a* and 38*b* to separately store Isoc and Asyn packets, and allows the first and second DMA I/Fs 39*a* and 39*b* to separately interface Isoc and Asyn packets. It is therefore possible to simultaneously execute the transfer of the reception Isoc packet 31 in the Isoc transfer mode and the transfer of the reception Asyn packet 32 in the Asyn transfer mode. In other words, transferring the reception Isoc packet 31 is not interrupted in the Isoc transfer mode while the reception Asyn packet 32 is transferred in the Asyn transfer mode. It is therefore possible to transfer moving picture data continuously and at a high speed to acquire moving pictures with a high degree of reality.

The MPU I/F 29 ensures the exchange of control data between the MPU 12 and the link layer processor 36. The operation of the MPU I/F 29 permits the IPC 11 to transfer the Isoc and Asyn packets 31 and 32 during exchange of the control data (see FIG. 8).

Third Embodiment

Figure 9:
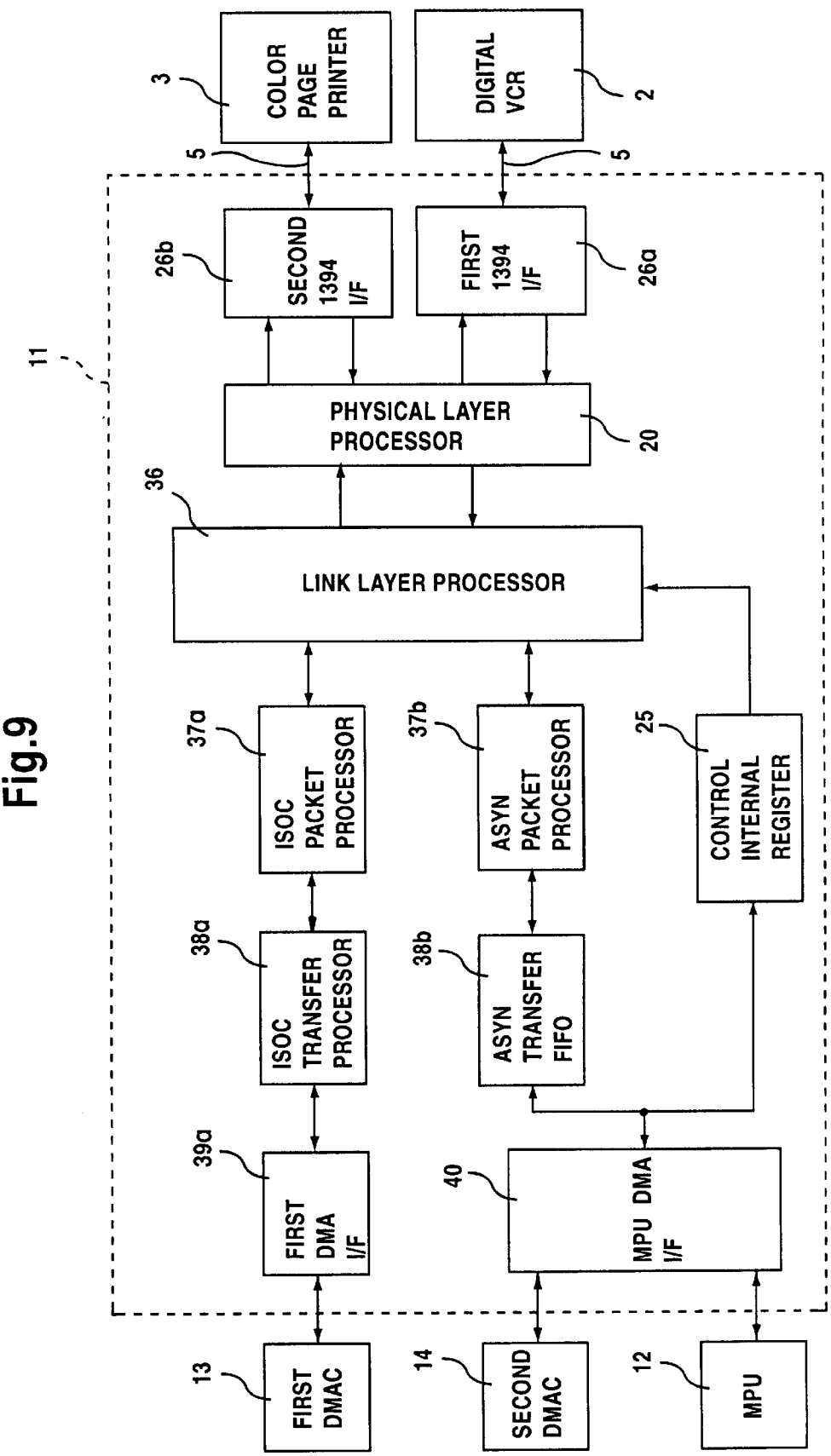
FIG. 9 is a block circuit diagram illustrating an IEEE 1394 protocol controller according to a third embodiment of the invention.

The third embodiment, which is a modification of the IPC 11 in the second embodiment, will be described below with reference to the accompanying drawings. To avoid a redundant description, like or same reference numerals are given to those components in the third embodiment which are the same as the corresponding components of the second embodiment. As shown in FIG. 9, the IPC 11 includes the physical layer processor 20, the first and second 1394 I/Fs 26*a* and 26*b*, the link layer processor 36, the Isoc packet processor 37*a*, the Asyn packet processor 37*b*, the Isoc transfer FIFO 38*a*, the Asyn transfer FIFO 38*b*, the first DMA I/F 39*a*, the control internal register 25 and an MPU and DMA interface (I/F) 40.

The MPU and DMA I/F 40 is connected to the second DMAC 14 and the MPU 12, and serves as the second DMA I/F 39*b* and the MPU I/F 29 in the second embodiment. The MPU and DMA I/F 40 receives a transmission Asyn packet supplied from the second DMAC 14 and supplies the transmission Asyn packet to the Asyn transfer FIFO 38*b*. The MPU and DMA I/F 40 receives a reception Asyn packet supplied from the Asyn transfer FIFO 38b and supplies it to the second DMAC 14. The MPU and DMA I/F 40 further receives control data supplied from the MPU 12 and supplies the control data to the control internal register 25. The MPU and DMA I/F 40 receives a reception control data supplied from the control internal register 25 and supplies it to the MPU 12.

Figure 10:
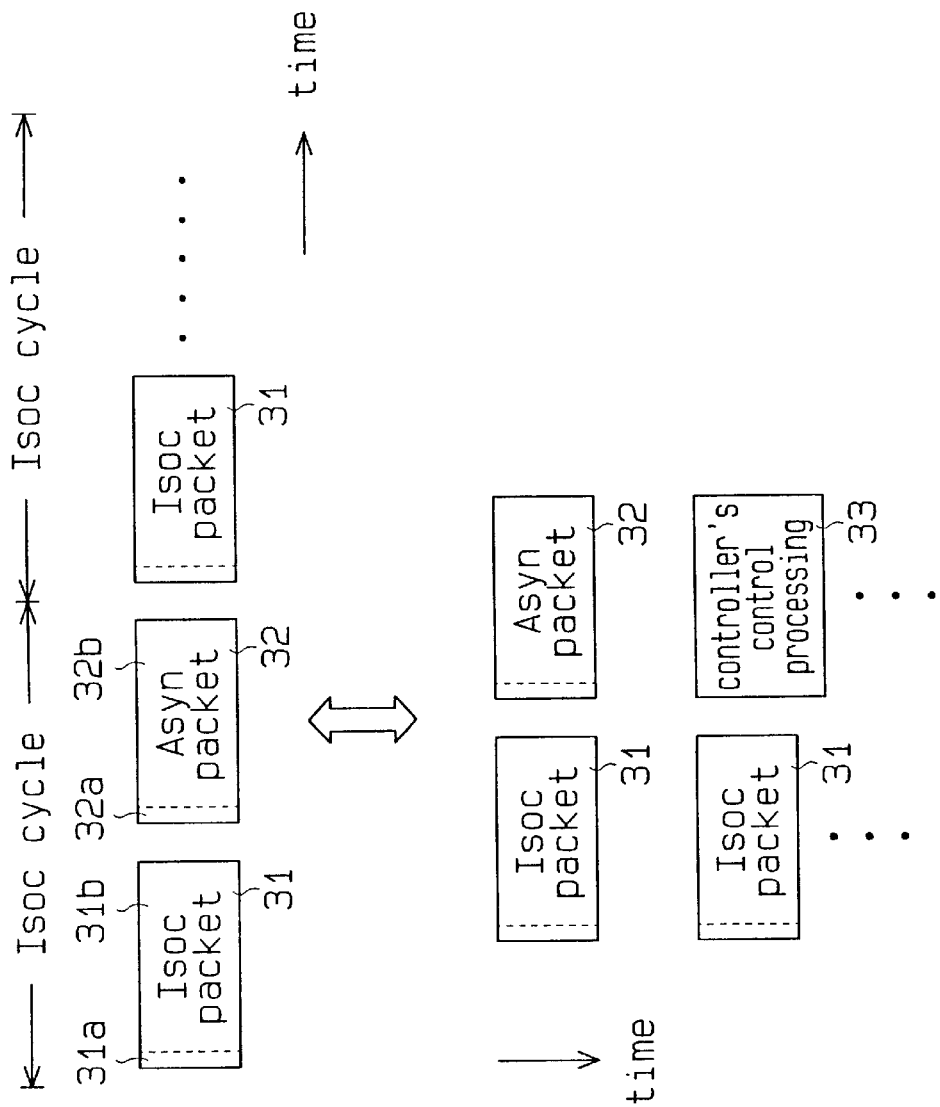
FIG. 10 is a diagram showing packets to be transferred by the IEEE 1394 protocol controller according to the third embodiment of the invention.

The operation of the IPC 11 of the third embodiment will be discussed below. For ease of illustration, it is assumed that transmission and reception Isoc and Asyn packets 31 and 32 are to be transferred in the order illustrated in FIG. 10. In the first Isoc cycle, the first reception Isoc packet 31 is supplied to the first DMAC 13 via the first 1394 I/F 26a, the physical layer processor 20, the link layer processor 36, the Isoc packet processor 37a, the Isoc transfer FIFO 38a and the first DMA I/F 39a, as per the second embodiment.

In the first Isoc cycle, the reception Asyn packet 32, which follows the reception Isoc packet 31, is supplied to the MPU and DMA I/F 40 via the first 1394 I/F 26a, the physical layer processor 20, the link layer processor 36, the Asyn packet processor 37b and the Asyn transfer FIFO 38b. The MPU and DMA I/F 40 determines that the reception Asyn packet 32 is the Asyn packet which has been supplied in the Asyn transfer mode, and supplies this reception Asyn packet 32 to the second DMAC 14.

In the second Isoc cycle following the first Isoc cycle, the first reception Isoc packet 31 is supplied to the first DMAC 13 via the first 1394 I/F 26a, the physical layer processor 20, the link layer processor 36, the Isoc packet processor 37a, the Isoc transfer FIFO 38a and the first DMA I/F 39a.

As apparent from the above, the constitution of the third embodiment allows the Isoc and Asyn transfer FIFOs 38a and 38b to separately store Isoc and Asyn packets, and allows the first DMA I/F 39a and the MPU and DMA I/F 40 to separately interface Isoc and Asyn packets. Therefore, transferring the reception Isoc packet 31 is not interrupted in the Isoc transfer mode while the reception Asyn packet 32 is transferred in the Asyn transfer mode. It is therefore possible to transfer moving picture data continuously and at a high speed to acquire moving pictures with a high degree of reality.

The MPU and DMA I/F 40 ensures the exchange of control data between the MPU 12 and the link layer processor 36. The operation of the MPU and DMA I/F 40 permits the IPC 11 to transfer the Isoc packet 31 during exchange of the control data while the control data 33 is being exchanged (see FIG. 10).

Fourth Embodiment

Figure 11:
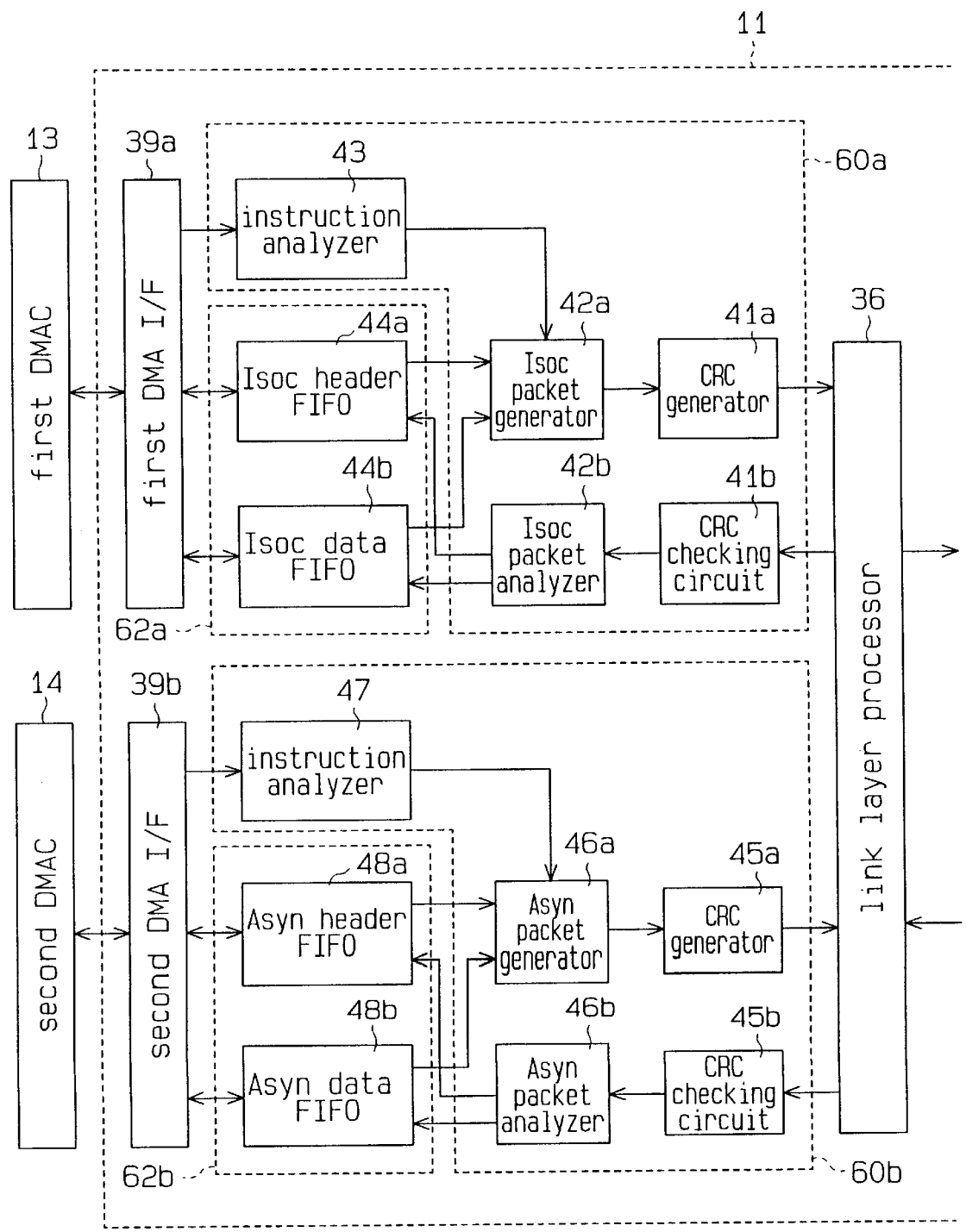
FIG. 11 is a block circuit diagram showing a part of an IEEE 1394 protocol controller according to a fourth embodiment of the invention.

The fourth embodiment, which is a modification of the IPC 11 in the second embodiment, will now be explained with reference to the accompanying drawings. In the fourth embodiment, the circuitry between the link layer processor 36 and the first and second DMA I/Fs 39a and 39b are modified as compared to the second embodiment. To avoid a redundant description, like or same reference numerals are given to those components in the fourth embodiment which are the same as the corresponding components of the second embodiment. As shown in FIG. 11, the IPC 11 has an Isoc packet processor 60a, connected between the link layer processor 36 and the first DMA I/F 39a, an Asyn packet processor 60b, connected between the link layer processor 36 and the second DMA I/F 39b, an Isoc transfer FIFO 62a, connected between the Isoc packet processor 60a and the first DMA I/F 39a, and an Asyn transfer FIFO 62b, connected between the Asyn packet processor 60b and the second DMA I/F 39b.

The Isoc packet processor 60a includes a CRC (Cyclic Redundancy Code) generator (error correction code generator) 41a, a CRC checking circuit (error correction checking circuit) 41b, an Isoc packet generator 42a, an Isoc packet analyzer 42b and an instruction analyzer 43. The Isoc transfer FIFO 62a includes an Isoc header FIFO 44a and an Isoc data FIFO 44b.

The CRC checking circuit 41b receives a reception Isoc packet supplied from the link layer processor 36, and performs error correction on the header and Isoc data in the reception Isoc packet. The CRC checking circuit 41b removes codes, which has been used in the error correction, from the reception Isoc packet and supplies the resultant reception Isoc packet to the Isoc packet analyzer 42b. The Isoc packet analyzer 42b counts the number of bytes of each of the header and Isoc data in the reception Isoc packet, and separates the header from the Isoc data. The number of bytes of the header is fixed to, for example, 8 bytes, of which 4 bytes are header information while the remaining 4 bytes are an error correction code. The number of bytes of the Isoc data is counted based on data length information in the header.

The Isoc header FIFO 44a operates to store the header supplied from the Isoc packet analyzer 42b and supply the header to the first DMAC 13 via the first DMA I/F 39a in the storing order. The Isoc data FIFO 44b operates to store the Isoc data supplied from the Isoc packet analyzer 42b, and supply the Isoc data to the first DMAC 13 via the first DMA I/F 39a in the storing order. The first DMAC 13 receives the Isoc header supplied from the first DMA I/F 39a and continuously receives Isoc data based on the information in the header, such as the transaction type, data length and address.

The Isoc header FIFO 44a operates to store the transmission header supplied from the first DMAC 13 via the first DMA I/F 39a and supply this header to the Isoc packet generator 42a in the storing order. The Isoc data FIFO 44b operates to store the transmission Isoc data supplied from the first DMAC 13 via the first DMA I/F 39a and supply this Isoc data to the Isoc packet generator 42a in the storing order. The first DMAC 13 produces an instruction and supplies it to the instruction analyzer 43 via the first DMA I/F 39a. The instruction analyzer 43 analyzes this instruction and supplies instruction data necessary to produce a transmission Isoc packet to the Isoc packet generator 42a.

The Isoc packet generator 42a produces a transmission Isoc packet including a transmission header and transmission Isoc data in accordance with the instruction data supplied from the instruction analyzer 43. The produced transmission Isoc packet is supplied to the CRC generator 41a. The CRC generator 41a produces error correction codes for the header and Isoc data of the Isoc packet and affixes the produced error correction codes to the header and Isoc data. The resultant transmission Isoc packet is supplied to the link layer processor 36.

The Asyn packet processor 60b includes a CRC generator (error correction code generator) 45a, a CRC checking circuit (error correction checking circuit) 45b, an Asyn packet generator 46a, an Asyn packet analyzer 46b and an instruction analyzer 47. The Asyn transfer FIFO 62b includes an Asyn header FIFO 48a and an Asyn data FIFO 48b.

The CRC checking circuit 45b receives a reception Asyn packet 32 supplied from the link layer processor 36, and performs error correction on the header and Asyn data in the reception Asyn packet. The CRC checking circuit 45b removes codes, which has been used in the error correction, from the reception Asyn packet and supplies the resultant reception Asyn packet to the Asyn packet analyzer 46b. The Asyn packet analyzer 46b counts the number of bytes of each of the header and Asyn data in the reception Asyn packet, and separates the header from the Asyn data. The number of bytes of the Asyn data is counted based on a transaction code in the header.

The Asyn header FIFO 48a operates to store the header supplied from the Asyn packet analyzer 46b and supply the header to the second DMAC 14 via the second DMA I/F 39b in the storing order. The Asyn data FIFO 48b operates to store the Asyn data supplied from the Asyn packet analyzer 46b, and supply the Asyn data to the second DMAC 14 via the second DMA I/F 39b in the storing order. The second DMAC 14 receives the Asyn header supplied from the second DMA I/F 39b and continuously receives Asyn data based on the information in the header, such as the transaction type, data length and address.

The Asyn header FIFO 48a operates to store the transmission header supplied from the second DMAC 14 via the second DMA I/F 39b and supply this header to the Asyn packet generator 46a in the storing order. The Asyn data FIFO 48b operates to store the transmission Asyn data supplied from the second DMAC 14 via the second DMA I/F 39b and supply this Asyn data to the Asyn packet generator 46a in the storing order. The second DMAC 14 produces an instruction and supplies it to the instruction analyzer 47 via the second DMA I/F 39b. The instruction analyzer 47 analyzes this instruction and supplies instruction data necessary to produce a transmission Asyn packet to the Asyn packet generator 46a.

The Asyn packet generator 46a produces a transmission Asyn packet including a transmission header and transmission Asyn data in accordance with the instruction data supplied from the instruction analyzer 47. The produced transmission Asyn packet is supplied to the CRC generator 45a. The CRC generator 45a produces error correction codes for the header and Asyn data of the Asyn packet and affixes the produced error correction codes to the header and Asyn data. The resultant transmission Asyn packet is supplied to the link layer processor 36.

The operation of the IPC 11 of the fourth embodiment will now be discussed. Moving picture data is separated to a plurality of reception Isoc packets, which are in turn supplied to the IPC 11 Isoc cycle by Isoc cycle. The CRC checking circuit 41b receives a reception Isoc packet supplied from the link layer processor 36, performs error correction on the header and Isoc data of that reception Isoc packet and removes error correction codes from the reception Isoc packet. The Isoc packet analyzer 42b separates the header and Isoc data in each Isoc packet from each other, and supplies the header to the Isoc header FIFO 44a and the Isoc data to the Isoc data FIFO 44b. The first DMAC 13 sequentially reads the headers stored in the Isoc header FIFO 44a via the first DMA I/F 39a. The first DMAC 13 consecutively reads the Isoc data from the Isoc data FIFO 44b based on the information in the header, such as the transaction type, data length and address. The first DMAC 13 combines the consecutively read Isoc data to produce moving picture data and performs data processing of the moving picture data. The first DMAC 13 can therefore easily produce moving picture data by combining the Isoc data consecutively read from the Isoc data FIFO 44b without removing the header from the Isoc packet. This feature reduces the load on the first DMAC 13 and shortens the time needed for combining the Isoc data. As a result, the data processing speed is improved and continuous and real-time transfer of moving picture data is accomplished, providing moving pictures with a high degree of reality.

Assume that the first DMAC 13 has supplied plural pieces of transmission Isoc data formed by separating moving picture data into a plurality of segments, Isoc headers corresponding to the individual pieces of transmission Isoc data and an instruction, to the IPC 11. Each transmission Isoc data is stored in the Isoc data FIFO 44b via the first DMA I/F 39a. Each Isoc header is stored in the Isoc header FIFO 44a via the first DMA I/F 39a. The instruction analyzer 43 receives an instruction via the first DMA I/F 39a and supplies instruction data to the Isoc packet generator 42a. In accordance with this instruction data, the Isoc packet generator 42a couples the header, supplied from the Isoc header FIFO 44a, and the Isoc data, supplied from the Isoc data FIFO 44b, to produce a transmission Isoc packet. The CRC generator 41a receives the transmission Isoc packet supplied from the Isoc packet generator 42a and sends a transmission Isoc packet, which has error correction codes affixed to the header and Isoc data, to the link layer processor 36. The production of the transmission Isoc packet by the IPC 11 reduces the load on the first DMAC 13.

The Asyn data of reception Asyn packets are continuously supplied to the second DMAC 14 through the operations of the CRC checking circuit 45b, the Asyn packet analyzer 46b, the Asyn header FIFO 48a and the Asyn data FIFO 48b. Accordingly, the second DMAC 14 can combine the Asyn data, continuously read from the Asyn data FIFO 48b, to easily produce moving picture data. This feature reduces the load on the second DMAC 14.

The transmission Asyn data supplied from the second DMAC 14 is coupled to the associated header to produce a transmission Asyn packet through the operations of the Asyn header FIFO 48a, the Asyn data FIFO 48b, the Asyn packet generator 46a and the CRC generator 45a. The production of the transmission Asyn packet by the IPC 11 reduces the load on the second DMAC 14.

Fifth Embodiment

Figure 12:
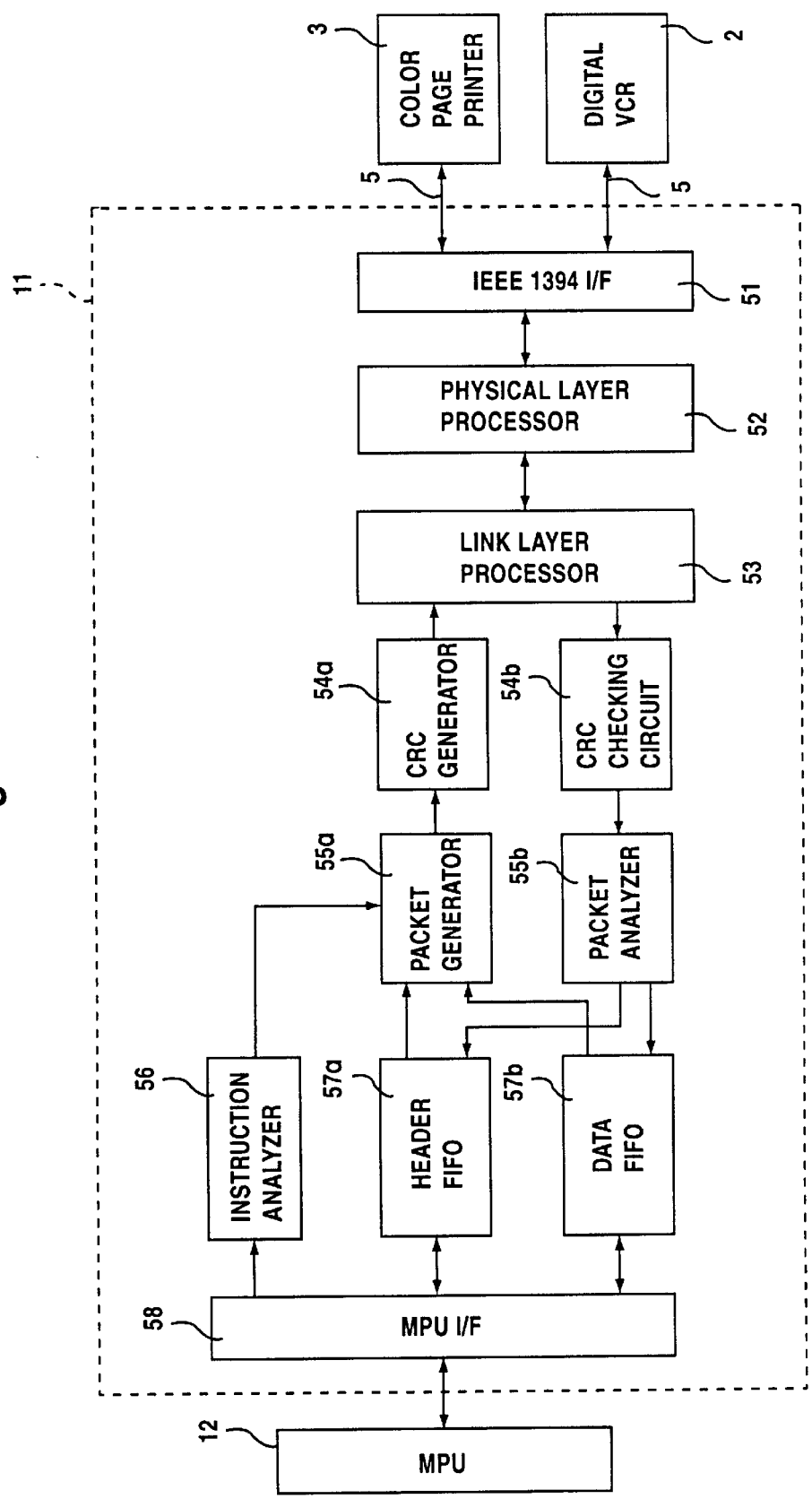
FIG. 12 is a block circuit diagram illustrating an IEEE 1394 protocol controller according to a fifth embodiment of the invention.

The fifth embodiment will be described below with reference to the accompanying drawings. As shown in FIG. 12, the IPC 11 incorporated in the personal computer 1 includes an IEEE 1394 interface (I/F) 51, a physical layer processor 52, a link layer processor 53, a CRC generator (error correction generator) 54a, a CRC checking circuit (error correction checking circuit) 54b, a packet generator 55a, a packet analyzer 55b, an instruction analyzer 56, a header FIFO 57a, a data FIFO 57b and an MPU interface (I/F) 58.

The IEEE 1394 I/F 51 is connected to the digital VCR 2 and the color page printer 3 by the IEEE 1394 bus 5, and exchanges Isoc and Asyn packets with the IPCs (not shown) of the digital VCR 2 and the color page printer 3. The physical layer processor 52 receives Isoc packets and Asyn packets supplied from the IEEE 1394 I/F 51 and supplies those packets to the link layer processor 53. Based on the headers in the Isoc and Asyn packets, the link layer processor 53 determines if the destination of those packets is the personal computer 1. When the received packets are to be supplied to the personal computer 1, the Isoc and Asyn packets are supplied to the CRC checking circuit 54b. When the destination of the received packets is not the personal computer 1, the link layer processor 53 sends the Isoc and Asyn packets back to the digital VCR 2, the color page printer 3 or the digital video camera 4 via the physical layer processor 52 and the IEEE 1394 I/F 51.

The physical layer processor 52 receives the transmission Isoc and Asyn packets supplied from the link layer processor 53, and supplies those packets to the digital VCR 2, the color page printer 3 or the digital video camera 4 via the 1394 I/F 51. The link layer processor 53 receives the reception Isoc and Asyn packets supplied from the physical layer processor 52, and supplies those packets to the CRC checking circuit 54b. The link layer processor 53 also receives the transmission Isoc and Asyn packets supplied from the CRC generator 54a, and supplies those packets to the physical layer processor 52.

The CRC checking circuit 54b receives the reception Isoc and Asyn packets supplied from the link layer processor 53, performs error correction on the header and data in each packet and removes error correction codes from each packet. The packet analyzer 55b receives the reception Isoc and Asyn packets supplied from the CRC checking circuit 54b, and separates the header and data in each packet from each other.

The header FIFO 57a operates to store the individual headers supplied from the packet analyzer 55b, and supply those headers to the MPU 12 via the MPU I/F 58 in the storing order. The data FIFO 57b operates to store individual pieces of data supplied from the packet analyzer 55b and supply those data to the MPU 12 via the MPU I/F 58 in the storing order. The MPU 12 receives the headers supplied from the header FIFO 57a and continuously reads data from the data FIFO 57b based on the information in each header, such as the transaction type, data length and address.

The header FIFO 57a operates to store the transmission Isoc and Asyn headers supplied from the MPU 12 via the MPU I/F 58, and supply those headers to the packet generator 55a in the storing order. The data FIFO 57b supplies the transmission Isoc and Asyn data from the MPU 12 to the packet generator 55a via the MPU I/F 58 in the storing order. The MPU 12 produces an instruction and supplies this instruction to the instruction analyzer 56 via the MPU I/F 58. The instruction analyzer 56 analyzes this instruction and produces instruction data necessary to produce transmission Isoc and Asyn packets.

In accordance with the instruction data supplied from the instruction analyzer 56, the packet generator 55a couples the transmission Isoc header and the transmission Isoc data to produce a transmission Isoc packet and couples the transmission Asyn header and transmission Asyn data to produce a transmission Asyn packet. The packet generator 55a supplies the produced transmission Isoc and Asyn packets to the CRC generator 54a. The CRC generator 54a produces error correction codes for the Isoc and Asyn headers and Isoc and Asyn data and respectively affixes the produced error correction codes to the Isoc and Asyn headers and the Isoc and Asyn data. The transmission Isoc and Asyn packets affixed with the error correction codes are supplied to the link layer processor 53.

The operation of the IPC 11 of the fifth embodiment will now be discussed below. Moving picture data is separated to a plurality of reception Isoc packets, which are in turn supplied to the IPC 11 Isoc cycle by Isoc cycle. The CRC checking circuit 54b receives a reception Isoc packet supplied from the link layer processor 53, performs error correction on the header and Isoc data of that Isoc packet and removes error correction codes from the Isoc packet. The packet analyzer 55b separates the header and Isoc data in each Isoc packet supplied from the CRC checking circuit 54b from each other, and supplies the header to the header FIFO 57a and the Isoc data to the data FIFO 57b.

The MPU 12 reads the Isoc headers stored in the header FIFO 57a via the MPU I/F 58, and consecutively reads the Isoc data from the data FIFO 57b based on the information in each header, such as the transaction type, data length and address. The MPU 12 combines the consecutively read Isoc data to produce moving picture data and performs data processing of the moving picture data. The MPU 12 can therefore easily produce moving picture data by combining the Isoc data consecutively read from the data FIFO 57b without removing the header from each Isoc packet. This feature reduces the load on the MPU 12 and shortens the time needed for data synthesizing process. As a result, the data processing speed is improved and continuous and real-time transfer of moving picture data is accomplished so as to produce moving pictures with a high degree of reality.

Suppose that the MPU 12 has supplied plural pieces of transmission Isoc data formed by separating moving picture data into a plurality of segments, Isoc headers corresponding to individual pieces of transmission Isoc data and an instruction, to the IPC 11. Each transmission Isoc data is stored in the data FIFO 57b via the MPU I/F 58. Each Isoc header is stored in the header FIFO 57a via the MPU I/F 58. The instruction analyzer 56 receives the instruction via the MPU I/F 58 and supplies instruction data to the packet generator 55a. In accordance with this instruction data, the packet generator 55a couples the header, supplied from the header FIFO 57a, and the Isoc data, supplied from the data FIFO 57b, to produce a transmission Isoc packet. The CRC generator 54a receives the transmission Isoc packet supplied from the packet generator 55a and sends a transmission Isoc packet, which has error correction codes affixed to the header and Isoc data, to the link layer processor 53. The production of the transmission Isoc packet by the IPC 11 reduces the load on the MPU 12.

The Asyn data of reception Asyn packets are continuously supplied to the MPU 12 through the operations of the CRC checking circuit 54b, the packet analyzer 55b, the header FIFO 57a and the data FIFO 57b. Accordingly, the MPU 12 can combine the Asyn data, continuously read from the data FIFO 57b, to easily produce moving picture data. This feature reduces the load on the MPU 12.

The transmission Asyn data supplied from the MPU 12 is coupled to the associated header to produce a transmission Asyn packet through the operations of the header FIFO 57a, the data FIFO 57b, the CRC generator 54a and the packet generator 55a. The production of the transmission Asyn packet by the IPC 11 reduces the load on the MPU 12.

Although only five embodiments of the present invention have been described herein, it should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A data processing apparatus for transferring transfer data supplied from an external device, comprising:

a first memory for receiving and storing first transfer data supplied from said external device in a first transfer mode for transferring data in a predetermined cycle;

a second memory for receiving and storing second transfer data supplied from said external device in a second transfer mode, said second transfer mode transferring said second transfer data using a remaining time resulting from exclusion of a time needed for transfer of said first transfer data from said predetermined cycle;

a first interface, connected to said first memory, for receiving said first transfer data read from said first memory and outputting said first transfer data; and a second interface, connected to said second memory, for receiving said second transfer data read from said second memory and outputting said second transfer data.

2. A data processing apparatus for exchanging transfer data between first and second internal devices and an external device, comprising:

a first memory for receiving and storing first reception transfer data supplied from said external device in a first transfer mode for transferring data in a predetermined cycle;

a second memory for receiving and storing second reception transfer data supplied from said external device in a second transfer mode, said second transfer mode transferring said reception second transfer data using a remaining time resulting from exclusion of a time needed for transfer of said first reception transfer data from said predetermined cycle;

a first interface, connected between said first memory and said first internal device, for receiving said first reception transfer data read from said first memory and supplying said first reception transfer data to said first internal device, and for receiving first transmission transfer data transferred to said external device, supplied from said first internal device and supplying said first transmission transfer data to said first memory, in said first transfer mode a second interface, connected between said second memory and said second internal device, for receiving said second reception transfer data read from said second memory and supplying said second reception transfer data to said second internal device, and for receiving second transmission transfer data transferred to said external device, supplied from said second internal device and supplying said second transmission transfer data to said second memory, in said second transfer mode, wherein said first memory receives and stores said first transmission transfer data from said first interface, and said second memory receives and stores said second transmission transfer data from said second interface.

3. The data processing apparatus according to claim 2, wherein said first memory includes a first reception memory for receiving and storing said first reception transfer data supplied from said external device in said first transfer mode and a first transmission memory for receiving and storing said first transmission transfer data supplied from said first interface in said first transfer mode;

wherein said second memory includes a second reception memory for receiving and storing said second reception transfer data supplied from said external device in said second transfer mode and a second transmission memory for receiving and storing said second transmission transfer data supplied from said second interface in said second transfer mode;

wherein said first interface includes a first reception interface, connected between said first reception memory and said first internal device, for receiving said first reception transfer data read from said first reception memory and supplying said first reception transfer data to said first internal device, and a first transmission interface, connected between said first transmission memory and said first internal device, for receiving said first transmission transfer data, supplied from said first internal device and supplying said first transmission transfer data to said first transmission memory; and wherein said second interface includes a second reception interface, connected between said second reception memory and said second internal device, for receiving said second reception transfer data read from said second reception memory and supplying said second reception transfer data to said second internal device, and a second transmission interface, connected between said second transmission memory and said second internal device, for receiving said second transmission transfer data, supplied from said second internal device and supplying said second transmission transfer data to said second transmission memory.

4. The data processing apparatus according to claim 2, wherein said data processing apparatus produces first control data to be supplied to a third internal device, and said second interface supplies said first control data to said third internal device and receives second control data supplied from said third internal device.

5. A data processing apparatus for exchanging packets with an external device, each packet including transfer data and a header affixed to said transfer data, and for exchanging transfer data and headers with an internal device, comprising:

a packet analyzer for receiving a first packet supplied from said external device and separating first transfer data and a first header in said first packet from each other in a first transfer mode for transferring a packet in a predetermined cycle, and receiving a second packet supplied from said external device and separating second transfer data and a second header in said second packet from each other in a second transfer mode, said second transfer mode transfers said second packet using a remaining time resulting from exclusion of a time needed for transfer of said first packet from said predetermined cycle;

a header memory, connected to said packet analyzer, for receiving and storing one of said first and second headers supplied from said packet analyzer;

a transfer data memory, connected to said packet analyzer, for receiving and storing one of said first and second transfer data supplied from said packet analyzer; and an interface, connected between said header memory, said transfer data memory and said internal device, for receiving one of said first and second headers read from said header memory and one of said associated first and second transfer data read from said transfer data memory, and supplying said one of said first and second headers and said one of said first and second transfer data separately to said internal device.

6. A data processing apparatus for exchanging packets with an external device, each packet including transfer data and a header affixed to said transfer data, and exchanging transfer data and headers with an internal device, comprising:

a packet analyzer for receiving a first reception packet supplied from said external device and separating first reception transfer data and a first reception header in said first reception packet from each other in a first transfer mode for transferring a packet in a predetermined cycle, and receiving a second reception packet supplied from said external device and separating second reception transfer data and a second reception header in said second reception packet from each other in a second transfer mode, said second transfer mode transfers said second reception packet using a remaining time resulting from exclusion of a time needed for transfer of said first reception packet from said predetermined cycle;

a header memory, connected to said packet analyzer, for receiving and storing one of said first and second reception headers supplied from said packet analyzer;

a transfer data memory, connected to said packet analyzer, for receiving and storing one of said first and second reception transfer data supplied from said packet analyzer;

an interface, connected between said header memory, said transfer data memory and said internal device, for receiving one of said first and second reception headers read from said header memory and one of said associated first and second reception transfer data read from said transfer data memory, and supplying said one of said first and second reception headers and said one of said first and second reception transfer data separately to said internal device, said interface further receives a first transmission header and first transmission transfer data supplied from said internal device and supplies said first transmission header to said header memory and said first transmission transfer data to said transfer data memory in said first transfer mode, and receives a second transmission header and second transmission transfer data supplied from said internal device and supplies said second transmission header to said header memory and said second transmission transfer data to said transfer data memory in said second transfer mode and a packet generator, connected to said header memory and said transfer data memory, for receiving said first transmission header read from said header memory and said associated first transmission transfer data read from said transfer data memory, and combining said first transmission header and said first transmission transfer data to produce a first transmission packet, and for receiving said second transmission header read from said header memory and said associated second transmission transfer data read from said transfer data memory, and combining said second transmission header and said second transmission transfer data to produce a second transmission packet, wherein said header memory receives and stores at least one of said first and second transmission headers supplied from said interface and said transfer data memory receives and stores at least one of said first and second transmission transfer data supplied from said interface.

7. The data processing apparatus according to claim 6, wherein said packet analyzer includes a first packet analyzer for receiving said first reception packet supplied from said external device and separating said first reception transfer data and said first reception header in said first reception packet from each other, and a second packet analyzer for receiving said second reception packet supplied from said external device and separating said second reception transfer data and said second reception header in said second reception packet from each other;

wherein said header memory includes a first header memory for receiving and storing said first reception header supplied from said first packet analyzer in said first transfer mode, and a second header memory for receiving and storing said second reception header supplied from said second packet analyzer in said second transfer mode;

wherein said transfer data memory includes a first transfer data memory for receiving and storing said first reception transfer data supplied from said first packet analyzer in said first transfer mode, and a second transfer data memory for receiving and storing said second reception transfer data supplied from said second packet analyzer in said second transfer mode;

wherein said interface includes a first interface for receiving said first reception header read from said first header memory and said first reception transfer data read from said first transfer data memory and separately supplying said first reception header and said first reception transfer data to said internal device, and a second interface for receiving said second reception header read from said second header memory and said second reception transfer data read from said second transfer data memory and separately supplying said second reception header and said second reception transfer data to said internal device;

wherein said first interface receives said first transmission header and said first transmission transfer data supplied from said internal device and supplies said first transmission header to said first header memory and said first transmission transfer data to said first transfer data memory in said first transfer mode, said second interface receives said second transmission header and said second transmission transfer data supplied from said internal device and supplies said second transmission header to said second header memory and said second transmission transfer data to said second transfer data memory in said second transfer mode;

wherein said first header memory receives and stores said first transmission header supplied from said first interface, said first transfer data memory receives and stores said first transmission transfer data supplied from said first interface, said second header memory receives and stores said second transmission header supplied from said second interface, and said second transfer data memory receives and stores said second transmission transfer data supplied from said second interface; and wherein said packet generator includes a first packet generator for receiving said first transmission header read from said first header memory and said first transmission transfer data read from said first transfer data memory and combining said first transmission transfer data and said first transmission header to produce said first transmission packet, and a second packet generator for receiving said second transmission header read from said second header memory and said second transmission transfer data read from said second transfer data memory and combining said second transmission transfer data and said second transmission header to produce said second transmission packet.

8. A method of processing and transferring transfer data supplied from an external device, comprising the steps of:

storing first reception transfer data supplied from said external device in a first memory in a first transfer mode for transferring data in accordance with a predetermined cycle;

storing second reception transfer data supplied from said external device in a second memory in a second transfer mode, the second transfer mode transfers said second reception transfer data using a remaining time resulting from exclusion of a time needed for transfer of said first reception transfer data from said predetermined cycle;

transferring said first reception transfer data read from said first memory using a first interface; and transferring said second reception transfer data read from said second memory using a second interface.

9. The method according to claim 8, further comprising the steps of:

supplying first transmission transfer data, to be transferred to said external device, to said first memory in said first transfer mode using said first interface;

storing said first transmission transfer data into said first memory;

supplying second transmission transfer data, to be transferred to said external device, to said second memory in said second transfer mode using said second interface; and storing said second transmission transfer data into said second memory.

10. A method of processing a series of transfer data divided into packets and transferring packets supplied from an external device, each packet having transfer data and a header affixed to said transfer data, said header including information associated with contents of said transfer data, said method comprising the steps of:

receiving packets supplied from said external device in a transfer mode for transferring packets in a predetermined cycle;

separating said transfer data and said header in each of said packets from each other;

storing said header in a header memory;

storing said transfer data in a transfer data memory;

reading said header from said header memory;

substantially continuously reading said transfer data from said transfer data memory based on the information included in said read header; and substantially continuously processing plural pieces of said read transfer data as said series of transfer data.

11. A method of processing a series of transfer data divided into packets and transferring packets supplied from an external device, each packet having transfer data and a header affixed to said transfer data, said header including information associated with contents of said transfer data, said method comprising the steps of:

receiving a first reception packet supplied from said external device in a first transfer mode for transferring packets in a predetermined cycle;

separating first reception transfer data and a first reception header in said first reception packet from each other;

storing said first reception header in a header memory;

storing said first reception transfer data in a transfer data memory;

reading said first reception header from said header memory;

substantially continuously reading said first reception transfer data from said transfer data memory based on the information included in said read header;

substantially continuously processing plural pieces of said read first reception transfer data as said series of transfer data;

receiving a second reception packet supplied from said external device in a second transfer mode, the second transfer mode transferring said second reception packet using a remaining time resulting from exclusion of a time needed for transfer of said first reception packet from said predetermined cycle;

separating second reception transfer data and a second reception header in said second reception packet from each other;

storing said second reception header in said header memory;

storing said second reception transfer data in said transfer data memory;

reading said second reception header from said header memory;

substantially continuously reading said second reception transfer data from said transfer data memory based on the information included in said read header; and substantially processing plural pieces of said read second reception transfer data as said series of transfer data.

12. The method according to claim 11, further comprising the steps of:

storing first transmission transfer data, to be supplied to said external device, in said transfer data memory in said first transfer mode;

storing a first transmission header corresponding to said first transmission transfer data in said header memory;

reading said first transmission transfer data from said transfer data memory;

reading said first transmission header from said header memory;

combining said first transmission transfer data and said first transmission header to produce a first transmission packet;

storing second transmission transfer data, to be supplied to said external device, in said transfer data memory in said second transfer mode;

storing a second transmission header corresponding to said second transmission transfer data in said header memory;

reading said second transmission transfer data from said transfer data memory;

reading said second transmission header from said header memory; and combining said second transmission transfer data and said second transmission header to produce a second transmission packet.

* * * * *